United States Patent Office 3,290,365
Patented Dec. 6, 1966

3,290,365
METHOD OF PREPARING CIS-CYCLOBUTANE-1,2-DICARBOXYLIC ACID
Janice L. Greene, Warrensville Heights, Ohio, assignor to The Standard Oil Company, Cleveland, Ohio, a corporation of Ohio
No Drawing. Filed June 21, 1963, Ser. No. 289,728
3 Claims. (Cl. 260—514)

This invention relates to a process for preparing cyclobutane-1,2-dicarboxylic acid by the hydrolysis of the adduct formed by reacting sulfuric acid monohydrate with cyclobutane-1,2-dicyanide.

It has been known that cyclobutane-1,2-dicyanide can be prepared from acrylonitrile according to the following equation:

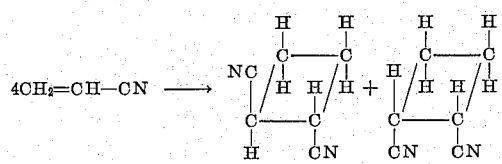

Both the cis and trans-isomers are formed, but they can be separated by efficient vacuum distillation. Thus the starting material in my process is a readily available and relatively inexpensive raw material. Either the cis or trans-dicarboxylic acids may be prepared from the cis or trans-adduct formed from the cis or trans-dicyanide, or a mixture of the dicarboxylic acids can be prepared by starting with a mixture of the dicyanides.

It is surprising that there is no isomerization of one form of isomer to the other during the process. This is advantageous because the initial easy separation of the dicyanide isomers is all that is necessary to obtain either form of the di-acid. It is especially surprising that the cis-dicarboxylic acid can be prepared by hydrolyzing the cis-cyclobutane-1,2-dicyanide sulfuric acid monohydrate, in view of the work reported by E. C. Coyner and W. S. Hillman, JACS, 71, 324 (1949), who found that both the cis and trans-cyclobutane-1,2-dicyanide upon hydrolysis in hydrochloric acid, gave only the trans-cyclobutane-1,2-dicarboxylic acid. Additional support for these findings were reported by Bode in Ber, 67B, 332 (1934), who also found that if cis-cyclobutane-1,2-dicarboxylic acid is heated in concentrated hydrochloric acid, the di-acid is converted to the trans-isomer. In view of this prior art, the use of the monohydrate of sulfuric acid as distinguished from other acids, is a critical feature of my invention.

The formation of the adduct is indicated by the following equation:

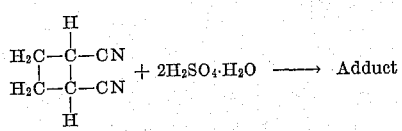

This step is described in application Serial Number 214,532, filed August 3, 1962, now U.S. Patent 3,202,695, by me jointly with another. In accordance with said application, the adduct can be prepared by mixing sulfuric acid monohydrate and the cyclobutane-1,2-dicyanide and subjecting the mixture to a temperature of 40° to 125° C. for from 15 minutes to 4 hours followed by cooling to ambient temperature. The higher the reaction temperature, the shorter the reaction time, and the lower the temperature, the longer the reaction time. The reaction is exothermic and external cooling can be used if desired. Temperatures of from 50° to 95° C. are preferred because higher temperatures may somewhat affect the stability of the cyclo-butane ring. The preferred reaction time in this temperature range is 1 to 2 hours. An excess of the acid monohydrate can be employed.

The exact molecular configuration of the adduct has not been established but it has the following general formula:

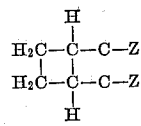

where Z has the empirical formula:

$$H_4O_5NS$$

The structure is postulated to be:

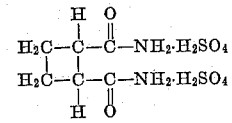

or

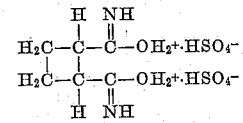

or

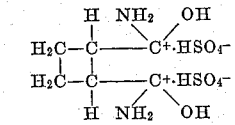

or other tautomeric forms.

The adduct, in accordance with this invention, is then converted to the corresponding dicarboxylic acid by reacting with water in accordance with the following equation:

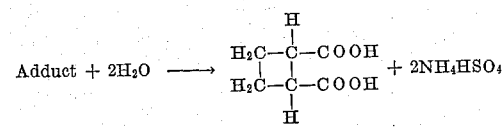

The adduct need not be purified or separated from the reaction mixture before the dicarboxylic acid is formed. At least the stoichiometric amount of water is required in the reaction to form either the cis or the trans-dicarboxylic acids. Preferably there is an excess sufficient to dissolve the amomnium bisulfate formed. Because of the difference in working up the desired product (as will be seen in the examples hereinafter), the upper limit, in the case of the cis-acid, depends on the partition coefficient of the cis-acid between water and the organic solvent. In the case of the trans-acid, the amount should be sufficient to dissolve the ammonium bisulfate but preferably not much more and preferably no more than 300 mole percent because amounts above this result in lower yields.

The hydrolysis is preferably carried out under reflux conditions to shorten the reaction time. In the case of the hydrolysis to form the trans product, the reaction is exothermic so that refluxing can take place without additional heat. In the case of hydrolysis to form the cis product, the reaction is not exothermic so that additional heat may be required to assure the completion of the hydrolysis reaction.

The method of working up the final dicarboxylic acid varies with the isomer because of their different physical properties. In the case of the trans-acid, the product precipitates from the reaction mixture, especially upon cooling, and the product can be separated by filtration, and purified if desired by recrystallization. In the case of the cis-acid, the product does not crystallize readily from the reaction mixture and the product is obtained by extracting it with a water immiscible solvent for the cis-diacid such as ether, benzene, toluene, chloroform, etc., and stripping the solvent from the extract.

The following are the examples of the best modes I contemplate for practicing my invention:

*Example I*

A mixture of 233 grams of trans-cyclobutane-1,2-dicyanide and 572 grams of sulfuric acid monohydrate was continuously stirred while being maintained at a temperature of 90° C. for 20 minutes. The adduct formation was then complete. In the next step 200 milliliters of ice-cold water was rapidly added to the stirred mixture whereupon the temperature rose rapidly to 140° C. during refluxing. After stirring for 20 minutes, the mixture was poured into a beaker and crystals of the product formed immediately in essentially quantitative yield. Filtration followed by recrystallization from water gave 287 grams (91% yield) of trans-cyclobutane-1,2-dicarboxylic acid. The structure was confirmed by infra red analysis and the product had a melting point of 128–131° C.

*Example II*

In a 250 milliliter three-necked flask equipped with a dropping funnel, a thermometer and a stirrer, was placed 23.26 grams of sulfuric acid monohydrate. The flask was warmed to maintain a temperature which varied from not lower than 70° C. and not higher than 115° C. during a two-hour period during which was added intermittently 10.6 grams of cis-cyclobutane-1,2-dicyanide. After the addition of the dicyanide was completed, the contents of the flask were stirred for 25 minutes at the temperature stated, whereupon the formation of the adduct was complete. Then 60 milliliters of water (3.23 moles) was added at a temperature of 70° C. and the solution was refluxed for one hour. Following this the excess water was stripped by distillation and a tan solid weighing 41 grams was extracted with 400 grams of ether in a Soxhlet extractor for 16 hours. The extract was then heated to evaporate the ether and 15 grams of crude cis-cyclobutane-1,2-dicarboxylic acid were recovered. The crude di-acid was crystallized from benzene yielding 9 grams of a pale yellow crystalline solid corresponding to a yield of 62.5%. The structure was confirmed by infra red analysis and the melting point of the product was found to be 131.5 to 135° C.

The dicarboxylic acid produced by the process of my invention is useful in making polyester resins by reaction with polyols such as glycols, glycerol, pentaerythritol, etc., as will be understood by one skilled in the art.

I claim:

1. A process for preparing cis-cyclobutane-1,2-dicarboxylic acid which comprises forming an adduct by reacting cis-cyclobutane-1,2-dicyanide with sulfuric acid monohydrate, hydrolyzing the adduct and isolating the cis-cyclobutane-1,2-dicarboxylic acid from the reaction mixture.

2. The process of claim 1 wherein the cis-cyclobutane-1,2-dicarboxylic acid is isolated by extraction from the reaction mixture with a water immiscible solvent selected from the group consisting of ether, benzene, toluene and chloroform and stripping the solvent from the extract.

3. The process of claim 2 wherein the solvent is ether.

References Cited by the Examiner

UNITED STATES PATENTS 3,110,729  11/1963  Greene et al. _____ 260—557
3,202,695  8/1965   Greene et al. _____ 260—464

OTHER REFERENCES

Coyner et al.: "J. Am. Chem. Soc.," vol. 71, January 1949, pp. 324–326.

Albisetti et al.: "J. Am. Chem. Soc.," vol. 78, Jan. 20, 1956, pp. 472–475.

LORRAINE A. WEINBERGER, *Primary Examiner.*

R. K. JACKSON, *Examiner.*